US010430115B2

United States Patent
Goren

(10) Patent No.: US 10,430,115 B2
(45) Date of Patent: Oct. 1, 2019

(54) SYSTEM AND METHOD FOR OPTIMIZING MULTIPLE PACKAGING OPERATIONS IN A STORAGE SYSTEM

(71) Applicant: Reduxio Systems Ltd., Tel Aviv (IL)

(72) Inventor: Avi Goren, Tel Aviv (IL)

(73) Assignee: Reduxio Systems Ltd., Tel Aviv (IL)

( * ) Notice: Subject to any disclaimer, the term of this patent is extended or adjusted under 35 U.S.C. 154(b) by 229 days.

(21) Appl. No.: 15/627,550

(22) Filed: Jun. 20, 2017

(65) Prior Publication Data

US 2018/0364942 A1 Dec. 20, 2018

(51) Int. Cl.
*G06F 3/06* (2006.01)
*G06F 9/46* (2006.01)

(52) U.S. Cl.
CPC .......... *G06F 3/0659* (2013.01); *G06F 3/0604* (2013.01); *G06F 3/0673* (2013.01); *G06F 9/467* (2013.01)

(58) Field of Classification Search
None
See application file for complete search history.

(56) References Cited

U.S. PATENT DOCUMENTS

| | | | |
|---|---|---|---|
| 2010/0299639 A1* | 11/2010 | Ramsay | G06F 3/0486 715/835 |
| 2011/0296090 A1* | 12/2011 | Cornwell | G06F 3/061 711/103 |
| 2014/0258667 A1* | 9/2014 | Sudhakar | G06F 9/30043 711/169 |
| 2016/0267143 A1* | 9/2016 | Barsness | G06F 16/24568 |

* cited by examiner

Primary Examiner — Michael Alsip
(74) Attorney, Agent, or Firm — Pearl Cohen Zedek Latzer Baratz LLP

(57) ABSTRACT

A system and method for managing a transactional storage system may include recording, for a data element in a storage transaction, a time of the storage transaction and a data element identifier. If more than one packaging operations (POs) are required for reducing the number of stored storage transactions related to the data element identifier then a system and method may reduce the number of POs by: receiving, for the data element identifier, a first and a second PO commands respectively related to a first and a second time intervals, and if the first time interval is contained in the second time interval then selecting to execute only the second PO command.

18 Claims, 5 Drawing Sheets

Contained operations (packaging operations) are redundant and may be removed     *501*

SYSTEM AND METHOD FOR OPTIMIZING MULTIPLE PACKAGING OPERATIONS IN A STORAGE SYSTEM

FIELD OF THE INVENTION

The present invention relates generally to packaging operations in a storage system. More specifically, the present invention relates to optimizing the execution of multiple packaging operations in a storage system.

BACKGROUND OF THE INVENTION

Storage systems, platforms and methods such as disk arrays and databases are known in the art. Data may be written to, or stored in, a storage system, data in a storage system may be modified and data may be deleted or removed from a storage system. Storage systems use data elements or data blocks and identifiers of data elements. For example, the actual content of a file stored in, or written to, a storage system may be broken into a set of data elements or data blocks that may be stored in a respective set of physical locations or addresses in a hard disk or other media. Identifiers of data elements or data blocks (for example, their addresses) may be used for performing, by the storage system, various tasks. For example, to read a file stored in a storage system, a list of identifiers may be used to locate the data elements or blocks that comprise or include the content of the file.

Known storage systems, platforms and methods suffer from a few drawbacks. For example, since data in a data element may be changed many times and possibly over a short time period, known storage systems are required to either perform each modification of a data block in real-time or maintain a log (or backlog) of operations to be performed.

SUMMARY OF THE INVENTION

An embodiment may include recording, for a data element in a storage transaction, a time of the storage transaction and a data element identifier. If more than one packaging operation (PO) is required for reducing the number of stored storage transactions related to the data element identifier then a system and method may reduce the number of POs by for example receiving, for or associated with the data element identifier, a first and a second PO commands respectively related to a first and a second time intervals or periods, and if the first time interval is contained in the second time interval then selecting to execute only the second PO command. An embodiment may delete the first PO from a list of POs for execution.

If the first PO command was executed and the first time interval is contained in the second time interval, then an embodiment may determine a partial time interval based on the end of the first time interval and the end of the second time interval; and execute a PO according to the partial time interval. If the first PO command was executed and the first time interval is contained in the second time interval, then if writes of the data element identifier were made during one or more time intervals included in the second time interval and excluded from the first time interval then an embodiment may discard the data elements. If no writes of the data element identifier were made during one or more time intervals included in the second time interval and excluded from the first time interval then an embodiment may keep the data elements, e.g., in a log or journal as described.

An embodiment may receive, for a data element identifier, a set of N PO commands [PO1, ..., POn]; and if, for each POi command included in the set, the time interval of POi is included in the time interval of POi+1 then the embodiment may determine one or two partial time intervals by excluding the time interval of PO1 from the time interval of POn, and the embodiment may execute one or two POs according to the one or two partial time intervals. A data element identifier may be a logical block address used by a logging storage system.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
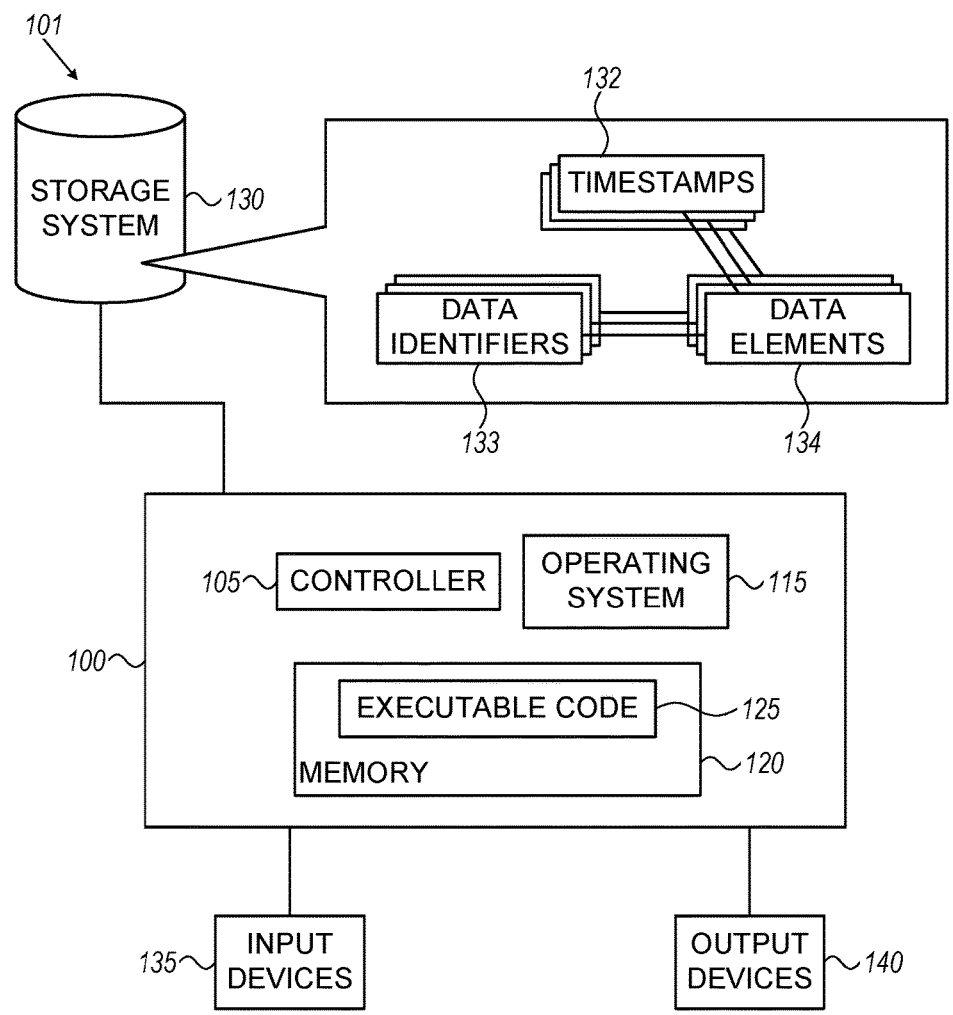
FIG. 1 shows high level block diagram of a system according to illustrative embodiments of the present invention.

Reference is made to FIG. 1, showing a high-level block diagram of a system 101 according to some embodiments of the present invention. System 101 may include computing device 100. Computing device 100 may include a controller 105 that may be, for example, a central processing unit processor (CPU), a chip or any suitable computing or computational device, an operating system 115, a memory 120, executable code 125, a storage system 130, input devices 135 and output devices 140.

As shown, storage system 130 may include a plurality of data elements 134, a plurality of data identifiers 133 and a plurality of timestamps 132. Only a single storage system 130 is shown in FIG. 1, however, it will be understood that any number of storage systems similar to storage system 130 may be included in a system according to some embodiments of the invention, for example, computing device 100 may be connected to, and may optimize multiple packaging operations (POs) in, or for, a plurality of storage systems such as storage system 130.

Controller 105 (or one or more controllers or processors, possibly across multiple units or devices) may be configured to carry out methods described herein, and/or to execute or act as the various modules, units, etc. for example by executing software or by using dedicated circuitry. More than one computing device 100 may be included in, and one or more computing devices 100 may be, or act as the components of, a system according to some embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

Executable code 125 may be any executable code, e.g., an application, a program, a process, task or script. Executable code 125 may be executed by controller 105 possibly under control of operating system 115. For example, executable code 125 may be an application that optimizes multiple POs. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a hard disk drive, a universal serial bus (USB) device or other suitable removable and/or fixed storage unit. Content may be stored in storage system 130 and may be loaded from storage system 130 into memory 120 where it may be processed by controller 105. For example, one or more data identifiers 133 and one or more timestamps 132 may be read from storage system 130 into memory 120 and may be examined or processed by controller 105. Storage system 130 may be directly connected to computing device 100 or it may be otherwise operatively connected to computing device 100, for example, a first storage system 130 may be connected to computing device 100 using a data bus as known in the art and a second storage system 130 may be connected to computing device 100 over a network.

Timestamps 132 may be any objects or constructs used for storing a time value or a timestamp. For example, a timestamp 132 may be a file, or object stored for example in a database or it may be a memory segment or object in a memory that may store a time value (or a timestamp as referred to in here and in the art), for example, a timestamp 132 may be an object that includes a time value that may be a Unix time as known in the art, e.g., to include, represent, reflect or indicate a specific date and time, a timestamp 132 may include or store the number of seconds that passed since Jan. 1, 1970 until the specific date and time, accordingly, a timestamp 132 may indicate, include, reflect or represent the time a data element was written to storage system 201, or the time the data element was modified etc.

Timestamps 132 may be used to record and/or maintain an order of modifications (e.g., read, write, delete and modify) of data elements in storage system 201. For example, a first timestamp 132 may include the time when a first data element was written, modified or deleted and, a second timestamp 132 may include the time when a second data element was written, modified or deleted or the second timestamp 132 may include the time when the first data element was modified again. Accordingly, using timestamps 132, an embodiment may readily determine the order of operations such as write, modify and/or delete of data elements.

A timestamp 132 may include or store a plurality of values, for example, a timestamp 132 may include a set of timestamps that indicate, reflect or represent the time a data element 134 was received, the time the data element 134 was stored (e.g., in persistent storage system 253), the last time a data element 134 was accessed and so on.

It is noted that although in some embodiments, to record and/or maintain an order of operations related to data elements in storage system 201, timestamps may be used to record the time of the operations, other embodiments or configurations may be contemplated.

Any code, value or other parameter that reflects, for a first transaction, an order in time with respect to a second transaction may be included in timestamps 132 and used by some embodiments to determine a time order of transactions. For example, any counter, running value or any other monotonically increasing (non-decreasing or simply increasing) function or value may be used to record and/or maintain an order of operations related to data elements in storage system 201. For example, a logging unit described herein may include, in a set of timestamps 132, a respective set of values that reflects an order in time of transactions, operations, commands or requests, e.g., a first timestamp 132 reflecting a first operation may include the value of 1, a second timestamp 132 reflecting a second, later operation, may include the value of 2 and so on.

Data elements 134 may be portions or blocks of data or any other applicable objects. For example, each of data elements 134 may be an object the size of 512 bytes. It will be understood that any type or size of data elements 134 may be used without departing from the scope of the invention.

Data identifiers 133 may be any objects or constructs used for storing any value or data that identifies a data element or a set of data elements. Data identifiers 133 may be used for accessing data elements. For example, a data identifier 133 may be, or may include, logical block addressing (LBA) value used by a logging or other storage system, and data elements 134 may be accessed using the LBA scheme as known in the art, e.g., a first data element 134 may be accessed using LBA 0, a second data element 134 may be accessed using LBA 1 and so on.

As shown by the lines connecting blocks 133 and 134 and by the lines connecting blocks 132 and 133, some of data elements 134 may be associated with some of data identifiers 133 and some of timestamps 132. In some embodiments, to associate a data identifier 133 and/or a timestamp 132 with a data element 134, a pointer or reference to the data element 134 may be included in the data identifier 133 and/or in the timestamp 132, e.g., such that using a pointer in a timestamp 132, the relevant or respective data element 134 can be located, retrieved or modified. In some embodiments, a pointer or reference included in a data identifier 133 and/or in a timestamp 132 may be an address or other reference, e.g., a physical address in a disk, an offset or an LBA value. In some embodiments, to associate a data identifier 133 and/or a timestamp 132 with a data element 134, a list, linked list, table or any other construct that maps data identifiers 133 and/or timestamps 132 to data elements 134 may be used.

Accordingly, given a data identifier 133 and/or a timestamp 132 (e.g. retrieved from storage 130 by controller 105) the data element 134 associated with, or pointed to, by the data identifier 133 and/or a timestamp 132 may be identified, located and manipulated by controller 105. It is noted that the association of data elements 134 with data identifiers 133 and/or with timestamps 132 may be a bidirectional or a two-way association, e.g., using pointers as described, given a data element 134, controller 105 may find a data identifier 133 associated with the data element 134 and/or one or more timestamps 132 associated with the data element 134.

Input devices 135 may be or may include a mouse, a keyboard, a touch screen or pad or any suitable input device. Accordingly, input from a user may be received by computing device 100. It will be recognized that any suitable number of input devices may be operatively connected to computing device 100 as shown by block 135. Output devices 140 may include one or more displays or monitors, speakers and/or any other suitable output devices. Accordingly, output from computing device 100 may be provided to a user. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Figure 2:
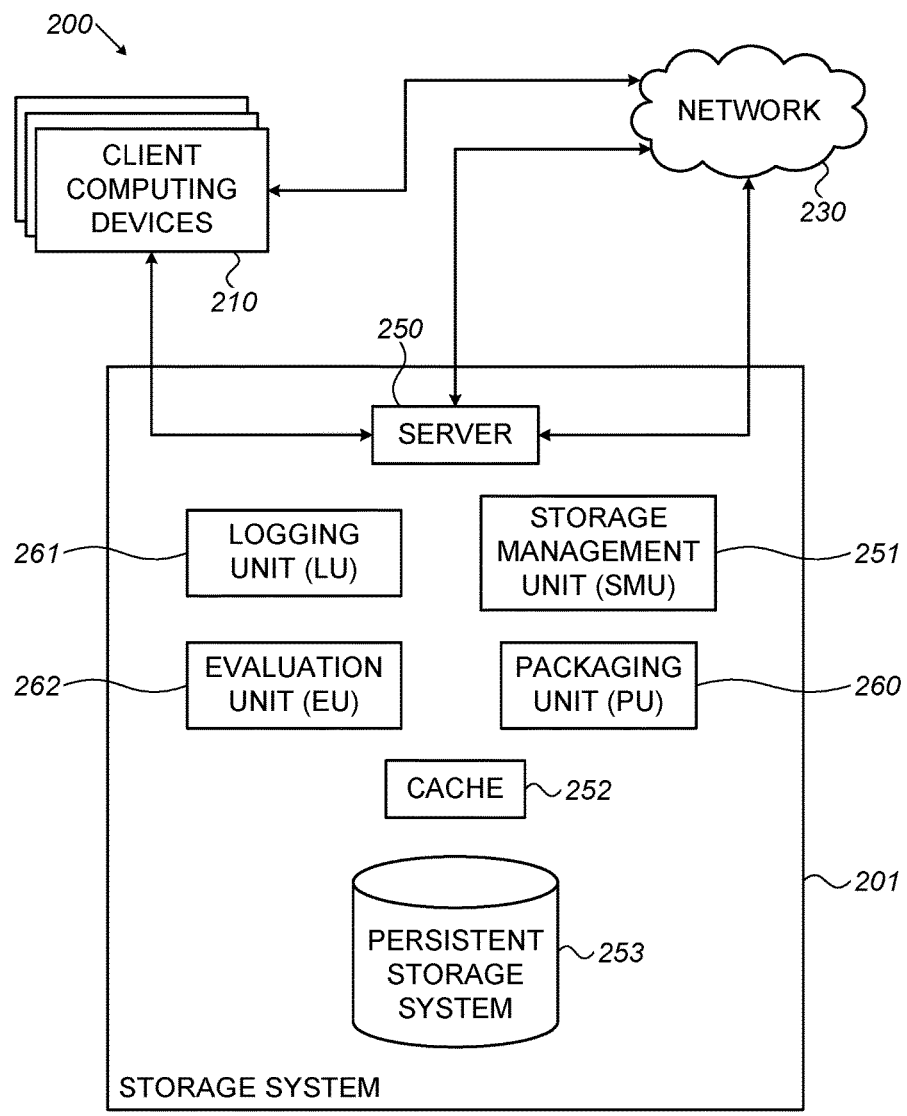
FIG. 2 shows high level block diagram of a system according to illustrative embodiments of the present invention.

Reference is made to FIG. 2, an overview of a system 200 and flows according to some embodiments of the present invention. As shown, a storage system 201 may include or may be connected to client computing devices 210. For example, client computing devices may be computers of users (e.g., in an organization) or they may be servers that use storage system 201 for storing their data. Server 250 in storage system 201 may be any suitable server computer as known in the art.

Cache 252 in storage system 201 may be any caching device or system as known in the art, e.g., cache 252 may include a volatile memory. As shown, cache 252 may be operatively connected to server 250 and/or SMU 251. For example, cache 252 may be a unit or device external to server 250 or it may be included or embedded in server 250. Persistent storage system 253 may be any suitable persistent storage system or device, e.g., an array of hard drives. It will be understood that storage system 201 may include any storage device or sub-system, e.g., storage system may include, or be operatively connected to, a plurality of storage systems 130 and that optimizing multiple packaging operations may be performed by embodiments of the invention for persistent storage system 253, cache 252 and/or any other storage device, system or component that may be included, or connected to, storage system 201.

Network 230 may be, may include or may be part of a private or public IP network, or the internet, or a combination thereof. As shown, network 230 may enable client computing devices 210 to communicate, or exchange date with, storage system 201, e.g., with server 250 in storage system 201, e.g., client computing devices 210 may use network 230 to send data to be stored (or modified) in storage system 201 and/or retrieve data from storage system 201.

Network 230 may be, comprise or be part of a global system for mobile communications (GSM) network. For example, network 230 may include or comprise an IP network such as the internet, a GSM related network and any equipment for bridging or otherwise connecting such networks as known in the art. Network 230 may be, comprise or be part of, a Fibre Channel (FC) network a Fibre Channel over IP (FCIP or FC/IP) or other networks used by storage platforms. In addition, network 230 may be, may include or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 230 are implied but not shown, e.g., access points, base stations, communication satellites, GPS satellites, routers, telephone switches, etc. It will be recognized that embodiments of the invention are not limited by the nature of network 230.

In some embodiments, storage system 201 may be a transactional storage system. Generally, a transactional storage system may be a storage system that stores or saves data included in received storage transactions. For example, a storage transaction may be a message or command that includes data (or payload) to be stored in storage system 201 or a storage transaction may be a command to delete, modify, copy or move data (e.g., a storage transaction may cause creation or modification of data in a storage system without including payload). A storage transaction may include, as data or payload, one or more data elements 134, in some embodiments, SMU 251 (or another unit in storage system 201) may extract the payload or actual data from a storage transaction, break or divide the payload into data elements 134, and store the data elements 134 in cache 252 and/or in persistent storage 253. In some embodiments, SMU 251 (or another unit in system 200) may perform any operations on, or manipulation of, data, e.g., prior to storing data in storage system 201, SMU 251 or another unit in system 200 may encrypt the data or payload, compress the data and so on.

In some embodiments, storage system 201 (or a component of storage system 201, e.g., SMU 251) may record, for a data element in a storage transaction, a time of the storage transaction, a code, value or other parameter that reflects an order in time with respect to other transactions, and a data element identifier. For example, an identifier 133 and a timestamp 132 may be updated or created for a data elements 134 in, or created based on content of, a transactional storage command or message. For example, to store data in storage system 201, a user of, or an application in, one of computing devices 210 may send a message or command (e.g. a storage transaction) that includes data to be stored in storage system 201. Upon or after receiving the storage transaction, SMU 251 or another unit in storage system 201 may extract data from the storage transaction, create data elements 134 from the extracted data, store the data elements 134 in cache 252 and/or in persistent storage 253, and associate an identifier 133 and a timestamp 132 with each of the data elements 134.

A value set, stored or included in a timestamp 132 associated with a data element 134 may be, may represent, or may otherwise be used for determining at least one of: the time content in the data element 134 was received by storage system 201; the time the data element 134 was stored in storage system 201 and/or the time the data element 134 was moved from cache 252 to persistent storage 253.

A value set, stored or included in an identifier 133 associated with a data element 134 may be, may represent, or may otherwise be used for determining at least the location or address of the data element 134, e.g., a value set, stored or included in an identifier 133 may be an offset in a hard disk or a hard drive, an LBA value, a combination of a logical unit number (LUN) and an LBA value and/or any data or information usable for locating a data element 134 in a storage system or device.

As shown, system 200 may include a storage management unit (SMU) 251, a packaging unit (PU) 260, a logging unit (LU) 261 and an evaluation unit (EU) 262. System 200 or components of system 200 may include components such as those shown in FIG. 1. For example, each of SMU 251, PU 260, LU 261 and EU 262 may be, or may include components of, computing device 100, e.g., each of these units may include a controller 105, a memory 120 and executable code 125. Although a set of units are shown in Fig. and described herein, in some embodiments, SMU 251 may include, or function as, PU 260, LU 261 and EU 262.

Storage management unit (SMU) 251 in storage system 201 may be a unit or module that may be included in server 250. For example, SMU 251 may be an application or program that, using a controller 105, memory 120 and executable code 125 in server 250, performs methods as described herein.

In some embodiments, LU 261 may be a history-keeping unit and may record or log operations (e.g., data transactions as described) related to a storage system 201, for example, metadata such as time of a data write to storage system 201 and a reference to a written or modified data element 134 may be recorded or logged by a logging or history-keeping unit. For example, a logging or history-keeping unit (e.g., SMU 251 or another unit in server 250 as described) may create, update, or otherwise maintain lists, tables or other constructs that associate identifiers 133 and timestamps 132 with data elements 134, thus, by for example, examining a set of timestamps 132 and associated identifiers past or historical events or data transactions may be characterized, identified or determined. Accordingly, storage transactions (e.g., requests or command to store, modify or delete data elements 134) may be logged or recorded by some embodiments. Data created by LU 261 may be used to quickly and efficiently obtain or determine metadata related to data elements 134, e.g., which data elements 134 were modified, deleted, or created during a time period or time interval.

In some embodiments, EU 262 may, given an input pair of data (e.g., of identifier 133 and timestamp 132) and using data created by LU 261, provide or output a result that may be a function of all data elements 134 associated with identifier 133 and associated with a time that is no later than the time in timestamp 132. For example, in in some embodiments, data elements 134 may be data blocks and identifiers 133 may be, or may include, LBA values or numbers and, provided with an input pair of (TIME, LBA), an output or result provided by EU 262 may be an indication of, or a reference to, the last block written to the LBA before the TIME in the input. In some embodiments, an output or result provided by EU 262 may be the actual data or payload, e.g., in the above example of (TIME, LBA), EU 262 may provide, as a result, or as output, the actual payload or content of the last data block (or data element 134) that was written to, or stored at, an address included or represented by the LBA in the input.

In some embodiments, PU 260 may reduce the number or amount of data elements in a logging or storage system thus, to name a few advantages, increase efficiency and speed of operation, and reduce cost, of a storage system or database. A packaging of elements or a packaging operation as described herein may be, or may include, coalescing, consolidating, merging or combining elements, accordingly, the terms packaging, coalescing, consolidating, merging and combining as referred to herein may mean the same thing and may be used interchangeably herein.

A packaging operation (PO) may be performed, by PU 260, based on, or in response to, a PO command. A PO or a PO command may be generated, created sent or received for, or with respect to, a data identifier (e.g., a data element identifier 133). For example, a PO or PO command may be an object or a message that includes a time interval or period and an identifier, e.g., in the form of (TIME-X, TIME-Y, ID) where TIME-X, TIME-Y define or represent the time interval and ID is, or includes a data element identifier.

A PO performed based on a PO command may include packaging a number of operations into a single operation such that the number of operation to be performed is decreased. For example, a PO may remove some operations, from a list of operations that need to be performed such that the list includes less operations. For example, as further described herein, a PO may identify, in a list or other construct, redundant operations and remove the redundant operations from the list or construct. For example, operations already performed or executed with respect to a first time interval may be ignored (or removed from a list) based on identifying a second time interval that includes the first time interval.

Accordingly, the description herein may include phrases such as "a PO for a data identifier" that mean, relate or refer to, a PO or PO command for a data element that is identified by the identifier.

For example, EU 262 may, after producing an evaluation as described, issue a PO command to PU 260. For example, after producing an evaluation for a data element with respect to a time interval (TIME-X, TIME-Y) and possibly after saving or storing a set of recorded operations and/or data elements 134 (e.g., recorded operations and data elements required to recover, configure or set a storage or other system to its state at time TIME-Y), EU 262 may issue a PO command to PU 260 to thus cause removal of redundant data elements with respect to the time interval (TIME-X, TIME-Y).

A PO may be performed for a specific data element 134. For example, a PO command may include a data element identifier 133, e.g., a PO command may include a time interval and in identifier in the form of (TIME-X, TIME-Y, ID) where ID may be a data element identifier 133. For example, after performing an evaluation for time "TIME1" and for a data element identified by an "LBA" (TIME1, LBA) as described, EU 262 may send a PO command to PU 260 in the form of (TIME1, TIME2, LBA).

A packaging operation (PO) performed by PU 260 may delete or remove recorded operations that may be determined to be redundant. For example, if a log (or other construct or object maintained by LU 261 as described) includes data showing, indicating or reflecting, that a data element 134 was written to, or stored in, storage system 201 at 10:00 AM, then, at 10:01 AM, a command or request to modify data element 134 (e.g., overwrite or replace with new content) was received and then, at 10:02 AM, a command or request to delete data element 134 was received, then a PO may remove, from a log or other object, the data or entries from times 10:00 and 10:01 since they may be redundant, e.g., if there is no interest in the state of storage system 201 at any time before 10:02.

In some embodiments, PU 260 may, given interval of time, e.g., defined by (TIME1, TIME2), as input, and the packaging unit may reduce the amount of data elements in, or of, a logging system. For example, PU 260 may reduce (e.g., in a list, table or other construct maintained by LU 261), the number of events, data elements, or entries that are associated with a time period or interval that is larger or later than TIME1 and smaller or precedes TIME2.

In some embodiments, PU 260 may modify only events, data, or entries in, or of, a logging system, that are related to a time window defined by (TIME1, TIME2) and the packaging unit may leave other data unchanged and/or unmodified. For example, PU 260 may avoid, or refrain from, modifying entries or data related to data transactions that occurred outside (e.g., before or after) a time interval or period defined by an input of (TIME1, TIME2).

It may be noted that a PO that may include removing entries from data in, or of, a logging system, performed by PU 260 as described, may change a subsequent output or result of an evaluation process or operation performed by EU 262. For example, since a result or output of EU 262 may be based on, according to, or a function of, data elements 134 associated with a time that is no later than the time in a timestamp 132, if the time in the timestamp 132 is later than TIME1 and earlier than TIME2 (TIME1<timestamp 132<TIME2), then, an evaluation of (TIME2, LBA) may be effected by a previous PO (TIME1, TIME2).

Advantages of some embodiments of the invention may be readily appreciated. For example, to provide data recovery or rollback, known systems and methods need to keep record or log of all data transactions and, when required to rollback a storage system to a specified time, these systems need to go through the log, from the beginning up to the specified time. In some embodiments, a user may provide an embodiment with input that indicates intervals or steps for recovery or rollback, record, save or keep a state, snapshot or context of a storage system every time period such as for example minute, hour or day. An embodiment may reduce the size of a log by removing, from the log, any data or entries that are not needed for recovering or rolling back a storage system as required by a user. For example, if a user wants to save the state of a storage system every hour, e.g., at 09:00, 10:00, 11:00 and so on and the user does not care about the state of the storage system at times like 09:28 then POs with input of (09:00, 10:00), (10:00, 11:00) and so on may be periodically and automatically performed by an embodiment such that consistency and state of the storage system at times 09:00, 10:00 and so on are saved (e.g., recorded in a log as described) and any data or entries not required for recovering the storage system to times 09:00, 10:00 and so on may be removed from the log, e.g., by a PO as described herein. Advantages of reducing the size of a log as described are obvious, for example, less memory is required when the size of a log is reduced, speed of operation is improved when working with short or small logs and the required computational resources are reduced as a log's size is reduced, e.g., searching or examining a few entries in a short or small log requires less CPU time then searching or examining thousands of entries in a large log file or object.

Yet other advantages may be related to a caching unit. For example, storage transactions received by storage system 201 may be stored in cache unit 252 (e.g., to increase speed) and logging, evaluation and packaging as described may be performed with respect to the cache unit 252. For example, data elements 134 written to cache 525 may be logged and associated with identifiers 133 and timestamps 132 as described. Data written to a cache 252 may subsequently be moved or copied to persistent storage unit 253, e.g., based on data in a log produced by LU 261 as described. For example, to maintain consistency and integrity, it may be required to chronologically read through or otherwise examine a cache log or other recordation of operations (such as cache writes) and copy or move data from the cache to a persistent storage system based on the log. By reducing the number of entries in a log (e.g., in a PO as described), operation and efficiency of a system may be improved, for example, each entry in a log removed by a PO may save a write to the persistent storage, a process known to be expensive in time and computational resources.

Figure 3A:
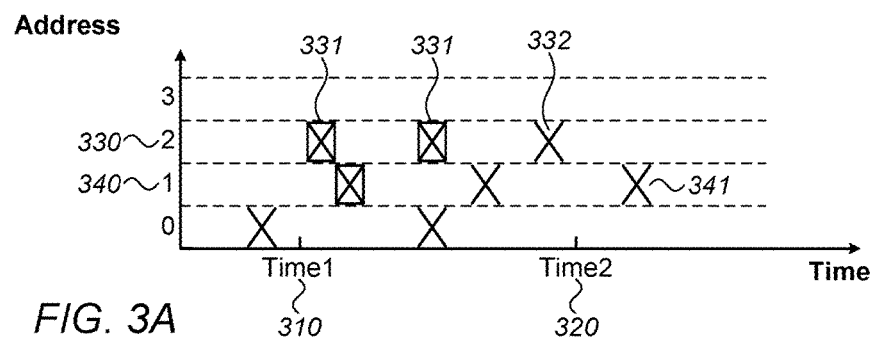
FIG. 3A graphically illustrates a packaging operation according to illustrative embodiments of the present invention.
Figure 3B:
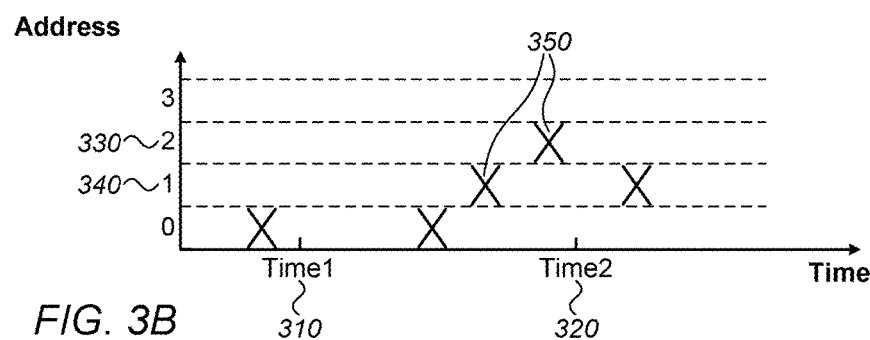
FIG. 3B graphically illustrates a packaging operation according to illustrative embodiments of the present invention.

Reference is made to FIG. 3A and to FIG. 3B which graphically illustrate a PO according to illustrative embodiments of the present invention. More specifically, FIG. 3A and FIG. 3B graphically illustrate erasing or deleting (e.g., from a log) write transactions for a time window marked or defined by TIME1 310 and TIME2 320 along a timeline as shown. For example, recorded write transactions or operations along a timeline as shown by blocks 331 and 332 may be examined by PU 260 that received (TIME1 310, TIME2 320) as input. As described, a packaging or collapsing operation may include deleting some of the entries or recordation related to the same address in a time window. For example, entries shown by blocks 331 may be deleted as part of a PO performed for address 330 and for time interval (TIME1 310, TIME2 320) such that, for a data element stored at address 330, only entry 332 may remain for TIME2 320. Similarly and as shown, for address 340, one entry may be deleted and one entry may be left for this address and for TIME2 320. As shown by entry 341, entries outside the time interval of (TIME1 310, TIME2 320) may be left untouched. FIG. 3B shows the state after a PO was performed, e.g., entries 331 no longer exist. For example, the set of entries 350 may be, may represent or may be used for producing a state of data in address 330 and 340 at time TIME2 320 and, entries 331 which are not required for producing the state or for rolling address 330 and 340 back to TIME2 are no longer included in a log, thus the log size may be reduced as described.

Figure 4:
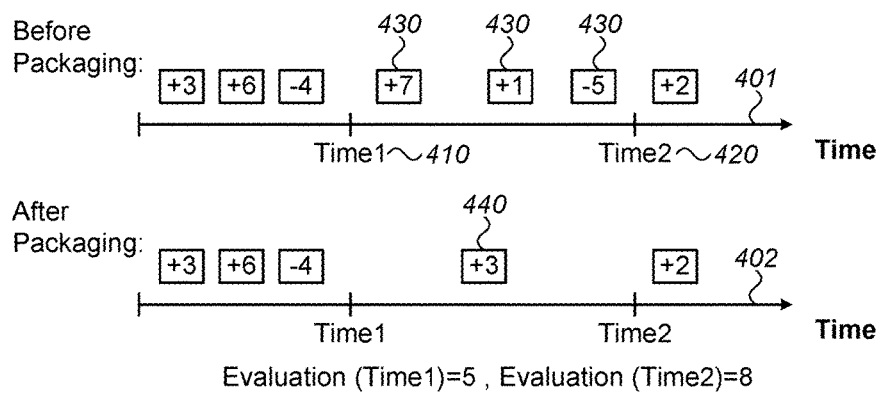
FIG. 4 graphically illustrates a packaging operation according to illustrative embodiments of the present invention.

Reference is made to FIG. 4 which graphically illustrates a packaging or merging operation of computational elements according to illustrative embodiments of the present invention. In some embodiments, instead of, or in addition to, POs related to data transactions as described, computational or logical operations along a timeline may be packed or merged. For example, assuming a specific object or value (e.g., +3 as shown) is stored in, or provided as input to, a system, and a set of logical or computational operations related to the value or object are subsequently received by the system, along a timeline 401, e.g., as shown by logical or computational operations 430. For example, after receiving a value of 3, SMU 251 may receive a logical or computational operation of +6 that means add 6 to received 3, then a −4 operation is received meaning subtract 4 from the result of 3+7 and so on as shown along timeline 401.

An embodiment may package or collapse a set of logged or recorded logical or computational operations, e.g., such that a correct result or value of an object at a specific time is saved, kept or stored while some of the logical or computational operations performed up to the specific time are removed from the log. For example, a PO performed by an embodiment with an input of (TIME1 410, TIME2 420) may produce a timeline or log as shown by timeline 402. For example, to evaluate an object, an embodiment may perform the three logged operations that occurred up to the time TIME1 410, an embodiment may determine that the evaluation (e.g., value of 5) needs to be stored, saved or kept for time TIME1 410, then by analyzing the set of operations in the following time period (TIME1 410, TIME2 420) and/or by applying the set of operations (e.g., +7, +1 and 31 5) to the object evaluation of TIME1 410, an embodiment may determine that the set of operations performed during the time interval defined by (TIME1 410, TIME2 420) is logically equivalent to adding 3 to the evaluation of the object that was stored, saved or kept for time TIME1 410 (e.g., add 3 to 5) and the embodiment may further determine that the value or evaluation of the object at TIME2 420 is 8. As clearly demonstrated, the log along timeline 402 includes less elements or entries then the log along timeline 401, accordingly, advantages described herein with respect to reducing a log size may be applicable to logical or computational operations as well as to data transactions as described.

Embodiments of the invention may improve or optimize POs. For example, execution of a set or batch of POs may be optimized by receiving, for a data element identifier 133, a first and a second PO commands respectively related to first and second time intervals, and, if the first time interval is contained in the second time interval then selecting to execute only the second PO command. For example, in some embodiments, if, given several PO's, there is a first PO for a time range, period or interval that is contained in the time range, period or interval of a second PO (e.g., the beginning of the first range is after the beginning of the second time range and the end of the first range is before the beginning of the second time range), then an embodiment may avoid or refrain from performing the first (contained) PO, e.g., instead of performing or executing the first and the second POs and embodiment may execute only the second (containing) PO.

Figure 5:
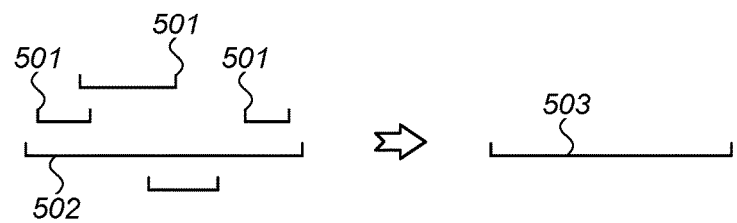
FIG. 5 graphically illustrates optimization of packaging operations according to illustrative embodiments of the present invention.

Reference is made to FIG. 5, a graphical illustration of an optimization of POs according to illustrative embodiments of the present invention. As shown, POs 501 may be timewise contained in PO 502. For example, the start times of all of POs 501 may all be greater or later than the start time of PO 502 and the end times of all of POs 501 may all be smaller or earlier than the end time of PO 502. For example, a PO command may include a time interval and a data identifier 133 such that PU 260 can determine or identify for which data element 134 and over what period of time a PO is to be executed. PU 260 may receive (e.g. from EU 262) a set or batch of PO commands for a respective set of time intervals where the PO commands in the set are all for or associated with the same data element 134 (e.g., all the PO commands in the set include the same or identical data identifier 133). In some embodiments, PU 260 may examine a set or batch of PO commands and select a sub-set or PO commands where the sub-set includes PO commands for or associated with the same data element 134. By removing POs contained in another PO, the number of POs may be reduced, possibly dramatically, accordingly, an additional advantage or improvement of a storage system may be provided by some embodiments of the invention. For example, instead of executing all of POs 501 and 502, an embodiment may execute only PO 503 thus increasing speed of operation of a system, minimizing usage of computational resources and/or enabling cost reduction of a system.

In some embodiments, PU 260 may store or record received PO commands and execute the received commands after they are received. For example, a surge of many PO commands may be buffered, stored or recorded and may be executed at a later stage or with some delay. For example, if an embodiment detects a high frequency of PO commands all of which are related to the same data element 134 then the embodiment may, for a preconfigured or threshold time period (e.g., for 5 seconds), buffer or cache the PO commands and then begin to execute them. By buffering a surge, or large number of PO commands during a short time period and then packaging the PO commands as described, efficiency of a system may be greatly increased.

In some embodiments, lists, tables or other construct or methods may be used for tracking or logging PO commands, e.g., a first list may include PO commands received but not yet executed and a second list may include PO that were already executed. Accordingly, an embodiment, e.g., PU 260, can determine or identify, at any point in time, the POs that were already performed or executed and the POs that are waiting to be executed.

In some embodiments, if the embodiment (e.g., PU 260) identifies and/or determines that a first PO command for a first time interval was executed (e.g., has already been executed) and that the first time interval is contained in a second time of (or for) a second PO, then the embodiment may determine a partial time interval based on the end of the first time interval and based on the end of the second time interval and the embodiment may define and/or generate a PO according to a partial time interval and may execute the defined and/or generated PO.

Figure 6:
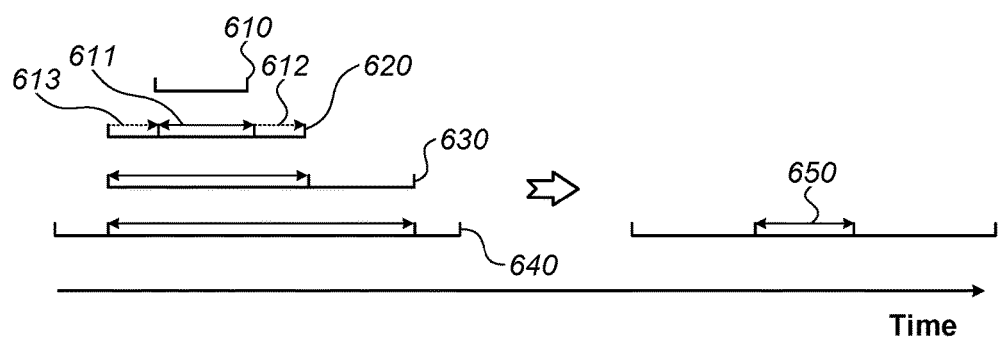
FIG. 6 graphically illustrates optimization of packaging operations according to illustrative embodiments of the present invention.

Reference is made to FIG. 6, a graphical illustration of an optimization of POs according to illustrative embodiments of the present invention. FIG. 6 graphically shows time intervals 610, 620, 630 and 640. For example, time interval 610 may be of a first PO that was executed and time interval 620 may be of a second or another PO that was not yet executed. As shown by left-right (or double headed) arrow 611, an overlap between time intervals may be identified by an embodiment (e.g., by comparing start and end times of the time intervals) and a partial interval as shown by dashed arrow 612 may be identified, calculated or determined. For example, having determined that a PO for time interval 610 was already executed then instead of executing a PO for time interval 620, an embodiment may define, generate and execute a PO for a time interval (or partial time interval) that starts at the end of time interval 610 and ends at the end of time interval 620 as shown by dashed arrow 612.

In some embodiments, if a first PO command for a first time interval was executed and the first time interval is contained in a second time interval of (or for) a second PO that was not executed, then an embodiment may exclude, remove, delete or ignore modifications of the related data element (e.g., modifications such as write, replace, change or delete a data element referenced by a data element identifier) that were made during one or more time intervals included in the second time interval and excluded from the first time interval.

For example, after determining that time interval 610 is contained in time interval 620 or that an overlap between these two time intervals includes time interval 610, e.g., if time interval 610 is represented by [T1, T2], time interval 620 is represented by [T3, T4] and interval 610 is included in time interval 620 (the inequation T3≤T1 and T2≤T4 is true), then modifications to, or manipulations of, the relevant data element (e.g., a data element identified by an identifier in a PO command) during the time interval shown by dashed arrow 613 may be ignored, e.g., entries in a log related to this time interval may be removed such they are not applied, or data elements written in that time interval may be removed or deleted. Accordingly, POs in a first time interval may be removed from a log, deleted from a list of POs for execution, or otherwise ignored based on determining execution of POs in a second time interval that is included in the first interval, e.g., some operations in interval 620 (as shown by dashed line 613) may be ignored or deleted based on identifying executed POs in interval 610 that is included in interval 620. By removing entries from a log, deleting redundant data and/or avoiding execution of redundant operations in a storage system as described, embodiments of the invention may improve a storage system.

In some embodiments, if PU 260 is provided (e.g., finds lists of executed and pending POs as described) a set or series of POs $[PO_1, \ldots, PO_n]$ where the time interval of $PO_i$ is included or contained in the time interval of $PO_{i+1}$, then the packaging unit may define, generate and/or execute a PO based on only the first PO ($PO_1$) and the last PO ($PO_n$) and the packaging unit may ignore or otherwise skip or avoid further processing of the rest of the POs (e.g., ignore $[PO_2, \ldots, PO_{n-1}]$).

Executing a PO operation as described may result in a decrease in the number of operations that may be required, e.g., in order to maintain data consistency. For example, a first request or command to delete data in blocks seven to twenty (7-20) may be received by a storage system and may be followed by a second request or command to delete data in blocks ten to twenty one (10-21) and the two requests or commands may be recorded or logged but not yet executed. A PO may combine the two requests or commands into a single operation that includes deleting blocks (7-21). Accordingly, performance of a storage system may be improved, e.g., by reducing the number of operations performed by the system, increasing speed and saving computational and storage resources.

In some embodiments, if provided with a set or series of POs $[PO_1, \ldots, PO_n]$ where the time interval of $PO_i$ is included or contained in the time interval of $PO_{i+1}$, then an embodiment may define, or determine one or two partial time intervals by excluding or removing the time interval of $PO_1$ from the time interval of $PO_n$, and the embodiment may create, generate and/or execute one or two POs according to the one or two partial time intervals. For example, two partial time intervals may be identified or defined by an embodiment by excluding or removing time interval 610 from time interval time interval 640. For example, a first partial time interval may start at the starting point (or time) of time interval 640 and end the starting point (or time) of time interval 610 and a second partial time interval may start at the end point (or time) of time interval 610 and the end point (or time) of time interval 640.

Figure 7:
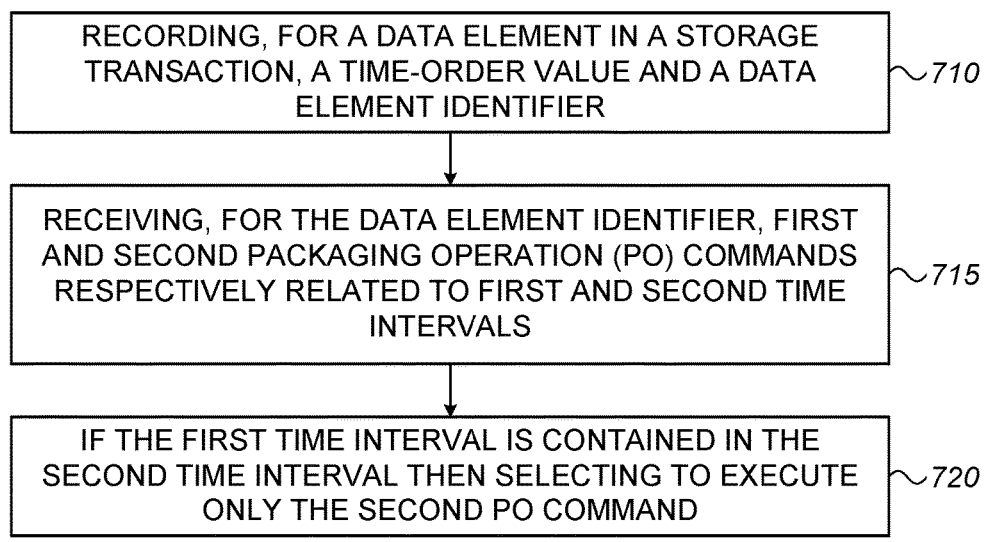
FIG. 7 shows a flowchart of a method according to illustrative embodiments of the present invention.

Reference is made to FIG. 7, a flowchart of a method according to illustrative embodiments of the present invention. As shown by block 710, a time-order value and a data element identifier may be recorded or stored for a data element in a storage system. For example, an embodiment may record an identifier (e.g., an LBA value provided as input as described) and a timestamp or value of a running counter for each storage transaction such that a journal or log of operations related to data identified by the identifier is created.

As shown by block 715, first and a second PO commands for a respective first and second time intervals may be received. For example, PO commands may be generated, received, obtained and performed by a system 200 as described herein.

As shown by block 720, if the first time interval is contained in the second time interval then an embodiment may select to execute only the second PO command. For example, the first PO may be ignored and/or deleted from a list or memory as described. If the first time interval is not contained in, or by, the second time interval, then an embodiment may check if the first time interval is contained in any other time interval related to the data element and/or an embodiment may examine additional data related to that data block, e.g., search for additional entries with the identifier of the data block, e.g., in recorded transactions, operations or commands as described.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A transactional storage system comprising:
a memory; and
a storage management unit to:
record, for a data element in a storage transaction, a time of the storage transaction and a data element identifier;
if more than one packaging operation (PO) is required for reducing the number of stored storage transactions related to the data element identifier then reduce the number of POs by:
receiving, for the data element identifier, a first and a second PO commands respectively related to a first time interval and a second time interval, and
if the first time interval is contained in the second time interval then selecting to execute only the second PO command.

2. The system of claim 1, wherein the storage management unit is configured to:
if the first PO command was executed and the first time interval is contained in the second time interval, then
determining a partial time interval based on the end of the first time interval and the end of the second time interval; and
executing a PO according to the partial time interval.

3. The system of claim 2, wherein the storage management unit is adapted to:
if the first PO command was executed and the first time interval is contained in the second time, then
if writes of the data element identifier were made during one or more time intervals included in the second time interval and excluded from the first time interval then discarding the data elements.

4. The system of claim 2, wherein the storage management unit is adapted to:
receiving, for a data element identifier, a set of N PO commands $[PO_1, \ldots, PO_n]$; and
if, for each $PO_i$ command included in the set, the time interval of $PO_i$ is included in the time interval of $PO_{i+1}$ then,
determining one or two partial time intervals by excluding the time interval of $PO_1$ from the time interval of $PO_n$, and
executing one or two POs included in the set according to the one or two partial time intervals.

5. The system of claim 1, wherein the data element identifier is a logical block address used by a logging storage system.

6. The system of claim 1, comprising deleting the first PO from a list of POs for execution.

7. A method comprising:
recording, for a data element in a storage transaction, a time of the storage transaction and a data element identifier;
if more than one packaging operations (POs) is required for reducing the number of stored storage transactions related to the data element identifier then reducing the number of POs by:
receiving, for the data element identifier, a first and a second PO commands respectively related to a first time interval and a second time interval, and
if the first time interval is contained in the second time interval then selecting to execute only the second PO command.

8. The method of claim 7, comprising:
if the first PO command was executed and the first time interval is contained in the second time, then determining a partial time interval based on the end of the first time interval and the end of the second time interval; and executing a PO according to the partial time interval.

9. The method of claim 8, comprising:

if the first PO command was executed and the first time interval is contained in the second time, then if writes of the data element identifier were made during one or more time intervals included in the second time interval and excluded from the first time interval then discarding the data elements.

10. The method of claim 8, comprising:

receiving, for a data element identifier, a set of N PO commands [$PO_1$, $PO_n$]; and if, for each $PO_i$ command included in the set, the time interval of $PO_i$ is included in the time interval of $PO_{i+1}$ then, determining one or two partial time intervals by excluding the time interval of $PO_1$ from the time interval of $PO_n$, and executing one or two POs included in the set according to the one or two partial time intervals.

11. The method of claim 7, wherein the data element identifier is a logical block address used by a logging storage system.

12. The method of claim 7, wherein the data element identifier is a logical block address used by a logging storage system.

13. A method comprising:

recording, for a data element in a storage transaction, a value representing an order in time of the storage transaction and a data element identifier;

if more than one packaging operations (POs) are required for reducing the number of stored storage transactions associated with the data element identifier then reducing the number of POs by:

receiving, for the data element identifier, a first and a second PO commands respectively related to a first time interval and a second time interval, and if the first time interval is contained in the second time interval then deleting the first PO from a list of POs for execution.

14. The method of claim 13, comprising selecting to execute only the second PO command.

15. The method of claim 13, comprising deleting the first PO from a list of POs for execution.

16. The method of claim 13, comprising:

if the first PO command was executed and the first time interval is contained in the second time, then determining a partial time interval based on the end of the first time interval and the end of the second time interval; and executing a PO according to the partial time interval.

17. The method of claim 16, comprising:

if the first PO command was executed and the first time interval is contained in the second time, then if writes of the data element identifier were made during one or more time intervals included in the second time interval and excluded from the first time interval then discarding the data elements.

18. The method of claim 16, comprising:

receiving, for a data element identifier, a set of N PO commands [$PO_1$, ..., $PO_n$]; and if, for each $PO_i$ command included in the set, the time interval of $PO_i$ is included in the time interval of $PO_{i+1}$ then, determining one or two partial time intervals by excluding the time interval of $PO_1$ from the time interval of $PO_n$, and executing one or two POs included in the set according to the one or two partial time intervals.

* * * * *